(12) United States Patent
Baechtle et al.

(10) Patent No.: US 8,920,221 B2
(45) Date of Patent: Dec. 30, 2014

(54) STUFFING TUBE CENTERING DEVICE AND METHOD FOR CENTERING A STUFFING TUBE

(71) Applicant: Albert Handtmann Maschinenfabrik GmbH & Co. KG, Biberach (DE)

(72) Inventors: Manfred Baechtle, Schemmerhofen (DE); Gerhard Schliesser, Wain (DE); Jochen Merk, Biberach (DE); Florian Osswald, Ulm (DE); Andreas Betz, Baustetten (DE)

(73) Assignee: Albert Handtmann Maschinenfabrik GmbH & Co., Biberach (DE)

( * ) Notice: Subject to any disclaimer, the term of this patent is extended or adjusted under 35 U.S.C. 154(b) by 0 days.

(21) Appl. No.: 14/087,057

(22) Filed: Nov. 22, 2013

(65) Prior Publication Data

US 2014/0179207 A1 Jun. 26, 2014

(30) Foreign Application Priority Data

Dec. 21, 2012 (EP) .................................... 12198970

(51) Int. Cl.
A22C 11/00 (2006.01)
A22C 11/02 (2006.01)
(52) U.S. Cl.
CPC ............. *A22C 11/02* (2013.01); *A22C 11/0227* (2013.01)
USPC .......................................................... 452/32

(58) Field of Classification Search
USPC ......................... 452/21–26, 30–35, 46–48, 51
See application file for complete search history.

(56) References Cited

U.S. PATENT DOCUMENTS

| 2,169,412 | A |   | 8/1939  | Freeman |
|-----------|---|---|---------|---------|
| 3,195,176 | A |   | 7/1965  | Washburn |
| 4,646,386 | A | * | 3/1987  | Dreisin .......................... 452/31 |
| 5,803,801 | A |   | 9/1998  | Vrijsen |
| 6,123,613 | A | * | 9/2000  | Righele .......................... 452/31 |
| 6,582,290 | B2 | * | 6/2003 | Hihnala et al. ................... 452/50 |
| 7,597,613 | B2 | * | 10/2009 | Staudenrausch ............... 452/32 |
| 7,647,749 | B2 | * | 1/2010 | Pinto et al. ....................... 53/417 |
| 7,704,130 | B2 | * | 4/2010 | Hanten et al. ................... 452/32 |
| 8,210,911 | B2 | * | 7/2012 | Kibler et al. .................... 452/32 |
| 2008/0236103 | A1 |  | 10/2008 | Lowder et al. |

FOREIGN PATENT DOCUMENTS

DE 4223128 A1 1/1993

OTHER PUBLICATIONS

Search Report for EP 12198970.1, dated May 6, 2013.

* cited by examiner

*Primary Examiner* — Richard Price, Jr.
(74) *Attorney, Agent, or Firm* — Marshall, Gerstein & Borun LLP (57) ABSTRACT

A stuffing tube centering device for concentric alignment of the stuffing tube to a casing stick and a corresponding method, and where two oppositely disposed centering members movable towards each other between which the stuffing tube can be held and centered.

16 Claims, 7 Drawing Sheets

STUFFING TUBE CENTERING DEVICE AND METHOD FOR CENTERING A STUFFING TUBE

CROSS-REFERENCE TO RELATED APPLICATION

The present application claims the benefit of priority of Europe Application No. 12 198 970.1, filed Dec. 21, 2012. The entire text of the priority application is incorporated herein by reference in its entirety.

FIELD OF THE DISCLOSURE

The disclosure relates to a stuffing tube centering device according to the preamble of claim 1 and a method for centering a stuffing, such as used in sausage production.

BACKGROUND

In sausage production, the sausage meat is discharged via a stuffing tube or a nozzle, respectively, into a sausage casing or an intestine. In this, so-called casing sticks are located on the stuffing tube. For drawing the casing sticks onto the stuffing tube, one or a plurality of stuffing tubes are moved axially or radially or combined axially/radially from a working position to in a draw-on position. This motion causes oscillations or position inaccuracies of the nozzle when the draw-on position is reached in relation to the center of the casing stick to be mounted on the stuffing tube. A complication additionally arises that the stuffing tubes can be bent easily, in particular long stuffing tubes with small diameters.

A centering prism applied to one side of the nozzle is used in practice, which is used primarily for calming the nozzle oscillations when the nozzles are long. This centering prism is pivotably mounted. During the drawing-on process, the face side of the casing stick pushes this prism away, so that it can fold away. When the stuffing tube is moved back to the production position, the centering prism can be returned to its initial position. Concentric alignment of the nozzle to the casing stick to be drawn on is a prerequisite for a secure draw-on process because the difference between the outer diameter of the stuffing tube and the inner diameter of the casing stick is often very little.

The nozzle must always securely abut on the centering prism, so that the same centering position is always attained. The disadvantage of this is that the nozzle must be moved beyond the draw-on position for it to abut securely on the centering prism. This centering prism is responsible for the open end of the stuffing tube to be positioned centrally to the casing stick to be drawn on. The single-sided nozzle centering device must be adjusted and positioned by the operator precisely to the diameter of the stuffing tube so that fail-safe operation can be warranted.

A method and a device are already known from DE 42 23 128 A1 for the separation and mounting of a casing stick on a stuffing tube.

SUMMARY OF THE DISCLOSURE

Starting from this, the present disclosure concerns providing a stuffing tube centering device and a corresponding method that allow accurate positioning of the stuffing tube in a simple manner.

According to the present disclosure, two oppositely disposed centering members are provided that can be moved towards each other, between which the stuffing tube is held and thereby centered. When assembling the stuffing tube centering device, the centering members are adjusted such that both centering members always maintain equal distance to its center, which also corresponds to the center of the stuffing tube. Thereby the center axis of the centering members or the center axis of the held stuffing tube, respectively, and the center axis of the casing stick to be drawn on or the casing draw device, respectively, are in alignment with each other. Since the centering members move towards each other and each always maintains the same distance from the center, the centering device does not need to be adjusted by the operator or be adapted to stuffing tubes with different diameters, respectively. Moreover, it is presently not necessary, as in prior art, to move the stuffing tube during the centering operation beyond the draw-on position for it to safely abut on the centering member. The centering members moving towards the stuffing tube from both sides ensure secure contact with the stuffing tube and thereby precise alignment.

The present disclosure enables a more precise positioning, greater process reliability when drawing on the casing stick, a higher draw-on speed, and a minimal gap between the nozzle and the drawn on casing stick.

According to a preferred embodiment, the stuffing tube centering device comprises a coupling element, in particular a mechanical coupling element that couples the motion of the centering members in the direction of the stuffing tube. When the motion of the centering members occurs on both sides in the same way towards the center axis M, it can be ensured that the stuffing tube is always aligned concentrically to the casing stick, and that there is no offset between the center axis of the stuffing tube and the center axis of the centering device. Furthermore, by using a corresponding coupling element, a drive for the two centering members can be employed.

The centering members at their front end comprise a centering recess in which the stuffing tube comes to rest. The centering recess is e.g. in particular V- or U-shaped, which means that the height of the centering recess increases at least in sections in the direction of the center axis of the device, when viewing a longitudinal section perpendicular to the center axis. Due to this shape, stuffing tubes of different sizes can be held and centered.

According to a particularly preferred embodiment, the centering members each comprise a support and a centering element rotatably mounted in the support. The centering device may be rotatably mounted around a respective axis in said support, wherein said axis Aa,Ab, extend in the direction perpendicular to the center axis (M) of the stuffing tube. Thereby, a linear motion of the support towards the center axis M is possible, whereby a pivoting motion of the centering elements can simultaneously occur. Due to the fact that the pivotable centering elements are provided in addition to the support, the lateral space required can be reduced because the centering elements can be easily folded away to an initial position, in which no stuffing tube is centered. It is also possible that the rotatably mounted centering element is moved not only by the motion of the support, but also, for example, by the casing stick or by magnetic forces. A combined motion is possible.

According to the present disclosure, the device comprises a drive that can move both supports in the direction of the stuffing tube and in the opposite direction. If a coupling element is provided, one drive is sufficient for both supports. This saves costs.

According to a preferred embodiment, the stuffing tube centering device comprises a guide for each centering member that is designed such that the centering elements are each pivoted from an open initial position with their front ends towards each other to the stuffing tube when the supports move apart and away from the stuffing tube. Initial position is to be understood as a position in which the front ends of the centering elements are pivoted away from each other at least so far, that a stuffing tube can be inserted into the draw-on position in which a casing stick is mounted. When the centering elements are then again in a position in which the front ends are in relation to the center axis M oppositely disposed, i.e. the centering recesses are facing each other, the supports can then be move to approach each other for centering the stuffing tube. A linear motion of the supports can realize a linear motion of both the centering elements towards the center axis M or the stuffing tube, respectively, as well as a simultaneous pivot motion.

It is particularly advantageous if the respective centering element and/or the respective support comprise at least one magnet.

The at least one magnet is advantageously arranged such that, when the centering elements are with their front ends pivoted apart by a certain pivot angle away from the stuffing tube, they are by magnetic force further pivoted up to a stop, preferably at the support, to the initial position and/or the centering elements are held by magnetic force in position at the stop on the support.

The centering elements can thereby be entirely folded back outwardly, independent of the motion of the support, and be held in this position.

The at least one magnet is advantageously arranged such that, when the centering elements are with their front ends pivoted towards each other towards the stuffing tube, the centering elements are at a certain pivot angle pivoted further by magnetic force up to a stop, preferably at the support, to a position in which the centering recesses are facing each other and/or the centering elements are held in this position at a stop at the support.

Due to the fact that the centering elements are pivotable, they can then also, when the casing stick has been pushed a certain distance onto the stuffing tube, be pivoted away by the casing stick from the stuffing tube, without this requiring any dedicated drive.

According to the method of the disclosure, the stuffing tube is from a working position, in which the casing stick is being filled, moved to a draw-on position when a new casing stick is to be mounted. This is to comprise, that the stuffing tube is initially brought into an intermediate or waiting position prior to the draw-on position. The two oppositely disposed centering members are moved toward each other and hold the stuffing tube therebetween and can thereby center the stuffing tube at a certain position.

A casing stick is pushed onto the centered stuffing tube by using a casing draw-on device, where the centering members move away from the stuffing tube when the casing stick has been pushed a certain distance onto the stuffing tube. Preferably, the moving casing stick then pivots away the centering element mounted in the support of the respective centering member.

After the casing stick is completely pushed onto the stuffing tube, the stuffing tube can then be moved back to its working position or, with a plurality of nozzles, to a corresponding prior waiting position.

When the stuffing tube centering device is assembled, the centering members, preferably the entire stuffing tube centering device, can advantageously be adjusted such that the center axis of the centering device, and thereby of the stuffing tube, is in alignment with a center axis of a casing draw-on device and therefore with the casing stick. Thereby, the operator must not every time perform an adjustment, in particular also not when changing to stuffing tubes with different diameters.

There are also machines in which the casing stick is not pushed onto the stuffing tube, but where the stuffing tube is inserted into the casing stick. Then, the stuffing tube centering device is axially displaceable together with the held stuffing tube (5).

BRIEF DESCRIPTION OF THE DRAWINGS

The present disclosure shall be explained in more detail with reference the following figures.

DETAILED DESCRIPTION OF THE PREFERRED EMBODIMENT

Figure 1:
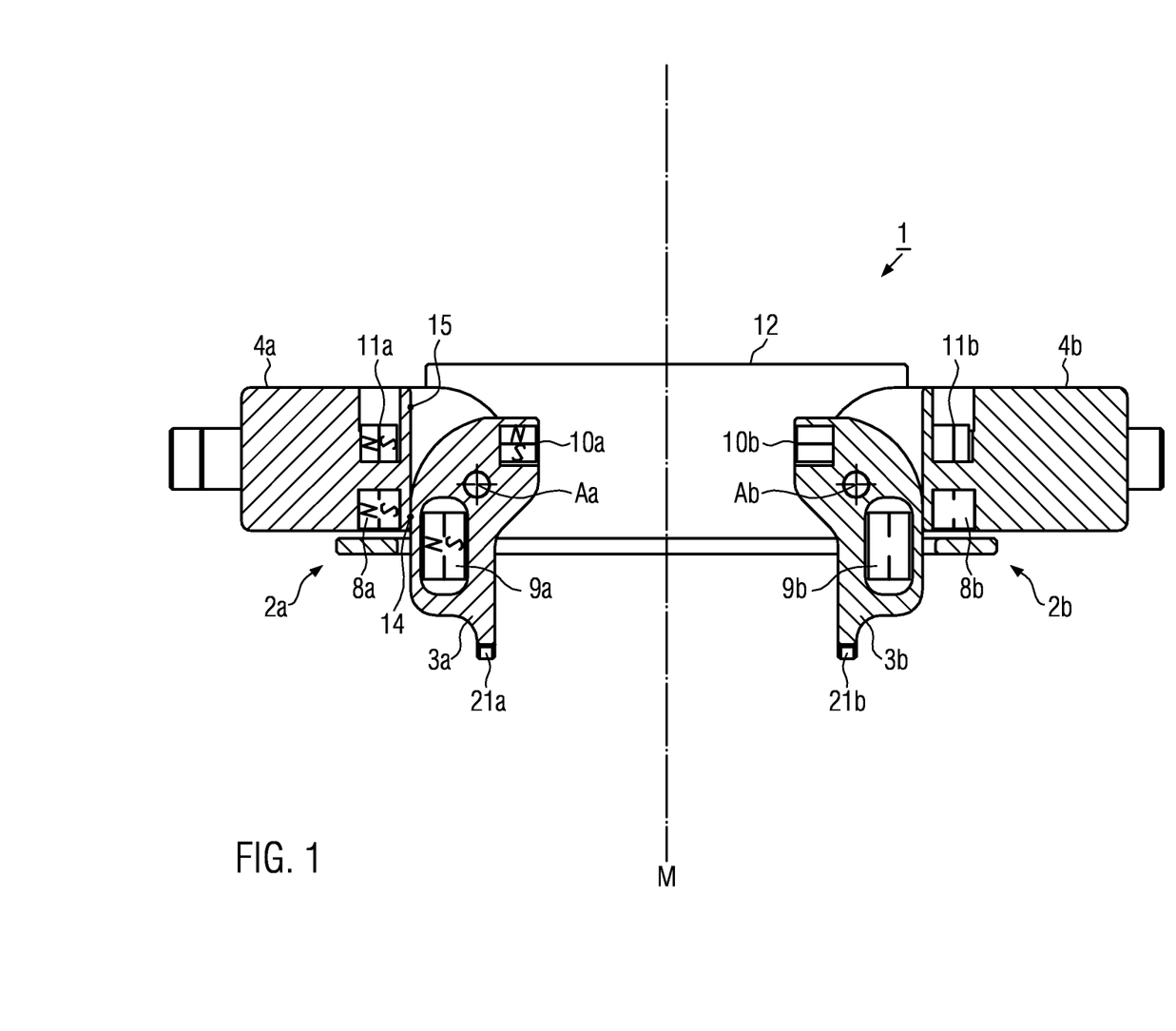
FIG. 1 is a cross section through a stuffing tube centering device according to one embodiment of the present disclosure in an initial position.
Figure 7:
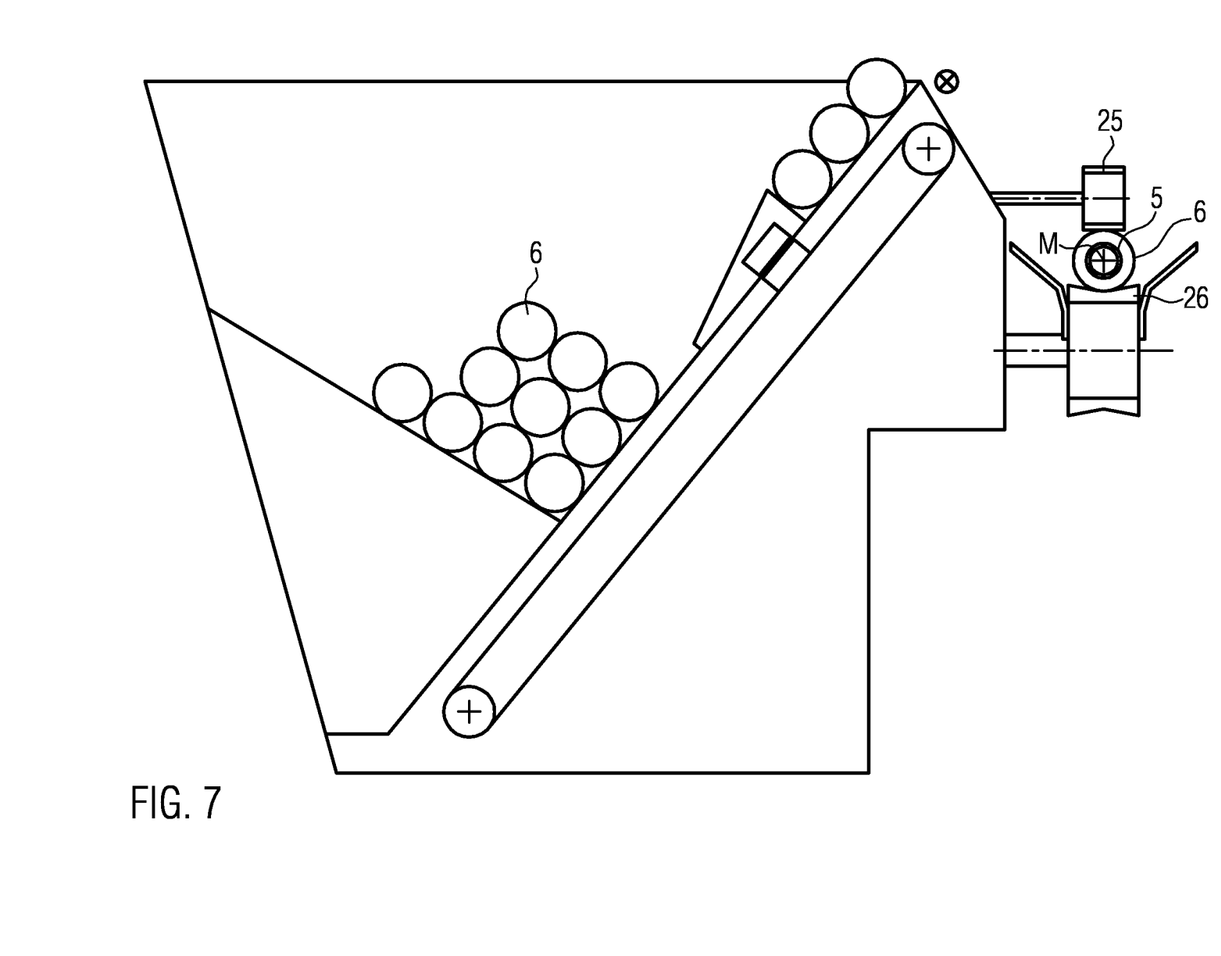
FIG. 7 very schematically shows a device for separating and mounting casing sticks onto a stuffing tube

FIG. 1 shows an embodiment of a stuffing tube centering device for concentric alignment of the stuffing tube 5 to a casing stick 6. For the production of sausages 5, casing sticks 6 are pushed onto a stuffing tube, where a pasty mass, e.g. sausage meat, is then discharged through the stuffing tube into the casing, which is then again drawn off the stuffing tube. For mounting the casing, as shown in FIG. 7, for example, a casing draw-on device is provided in which casing sticks 6 with a constant diameter are provided in a storage container and from there brought onto a conveyor device 26. The respective casing stick 6 is aligned on the conveyor device 26 with the aid of an apparatus 25 and then by the conveyor device 26 pushed onto or drawn from a stuffing tube 2, respectively.

Concentric alignment of the stuffing tube 5 to the casing stick 6 to be drawn on or to the casing draw-on device, respectively, is a prerequisite for a secure draw-on process because the difference between the outer diameter of the stuffing tube and the inner diameter of the casing stick is often very little.

The stuffing tube centering device 1 shown in FIG. 1 comprises two centering members 2a,b being movable towards each other, which each has the same distance to a center axis M and between which the stuffing tube 5 can be held and centered. The two centering members 2a,b are mounted and adjusted in the factory during assembly of the device such that the center axis M, corresponding also to the center axis M of the centered stuffing tube 5, is aligned with the center axis M of the casing stick 6 in the casing draw-on device. The centering members 2a,b each comprise a support 4a,b, and a centering element 3a,b rotatably mounted in the support. The centering element 3a,b is each pivotable about the respective axis Aa and Ab, respectively. The centering elements 3a,b further comprise centering recesses 21a,b at their front ends. As can be seen in particular from FIGS. 5 and 6, the stuffing tube 5 can beheld within the, for example, prism-shaped recesses 21a,b. The recesses 21a,b are each designed such that, in a longitudinal section through the centering element perpendicular to the center axis M, the height h of the recess in the direction of the center axis M increases, at least in part. The centering recess is presently in the sectional view in particular V-shaped. Due to this shape, stuffing tubes with different diameters can be securely held, without the system needing to be readjusted or refitted. The centering elements 3a,b are then moved so far in the direction of the center axis M, until the respective stuffing tube is held with a defined force.

In FIG. 1, the centering elements are located in an initial position, i.e. the centering elements 3a,b are pivoted away from the center axis M. In FIG. 1, a stuffing tube 5 is not yet in the device 1. In this embodiment, both the centering element 3a,b as well as the support 4a,b each comprise two magnets 8a, 11a, 10a, 9a. In the initial position shown in FIG. 1, the centering element 3a,b is held by magnetic force at the stop 14. The magnets are arranged such that the magnet 8a,b in the support 4a,b attracts the magnet 9a,b in the centering element 3a,b. Only one magnet could also be provided either in the support 4a,b or in the centering element 3a,b, which then attracts a corresponding metal portion.

Figure 2:
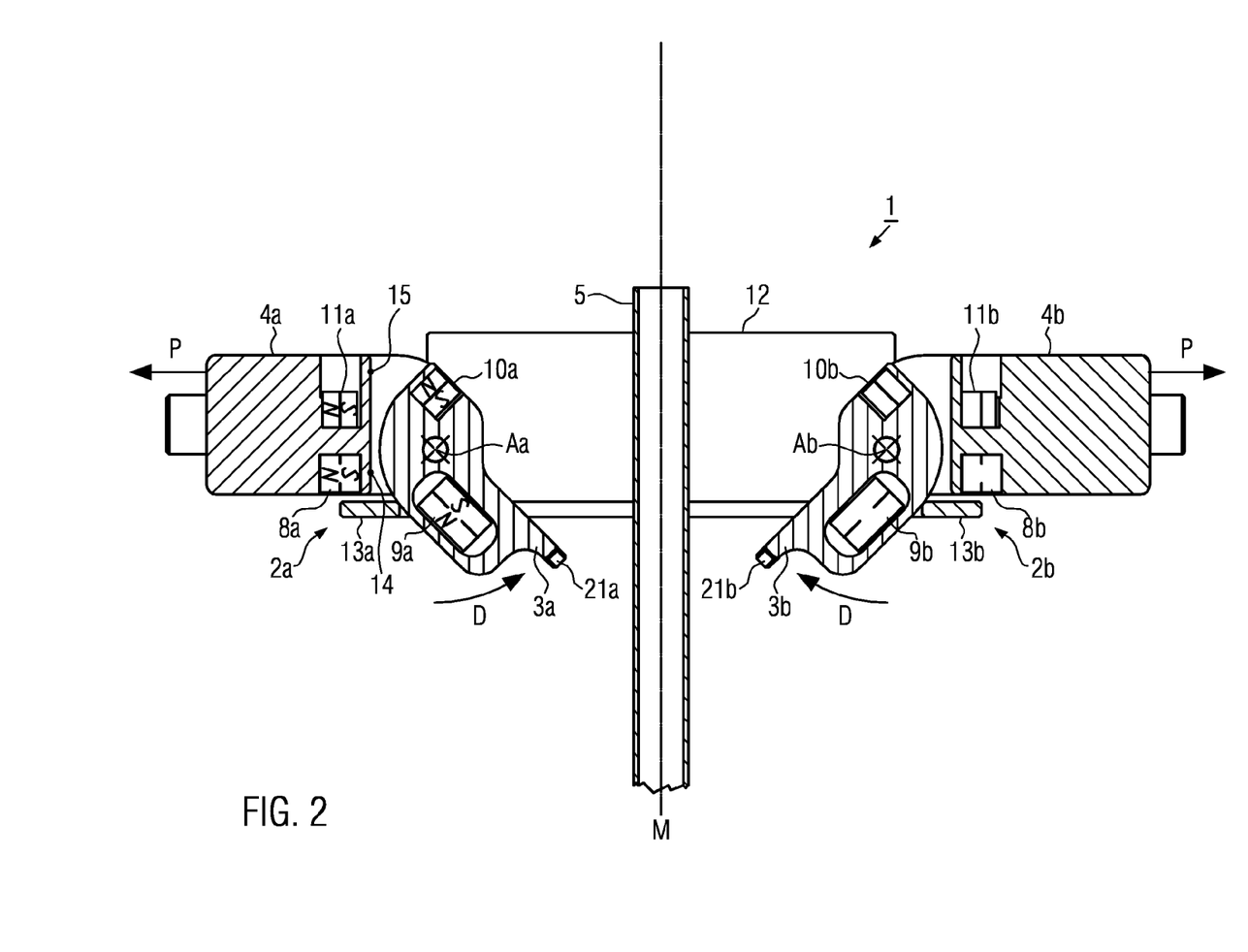
FIG. 2 shows the stuffing tube centering device from FIG. 1 with an inserted stuffing tube.

A stuffing tube 5 onto which a casing stick is to be drawn can be positioned by a corresponding device from a working position axially or radially or combined axially, radially in the draw-on position between the centering members, as shown in FIG. 2.

The centering members 2a,b, as is evident from FIG. 2, are movable towards and away from the center axis M. In this, the motion of the oppositely disposed centering members 2a,b is coupled, as is particularly evident from FIG. 5.

Figure 3:
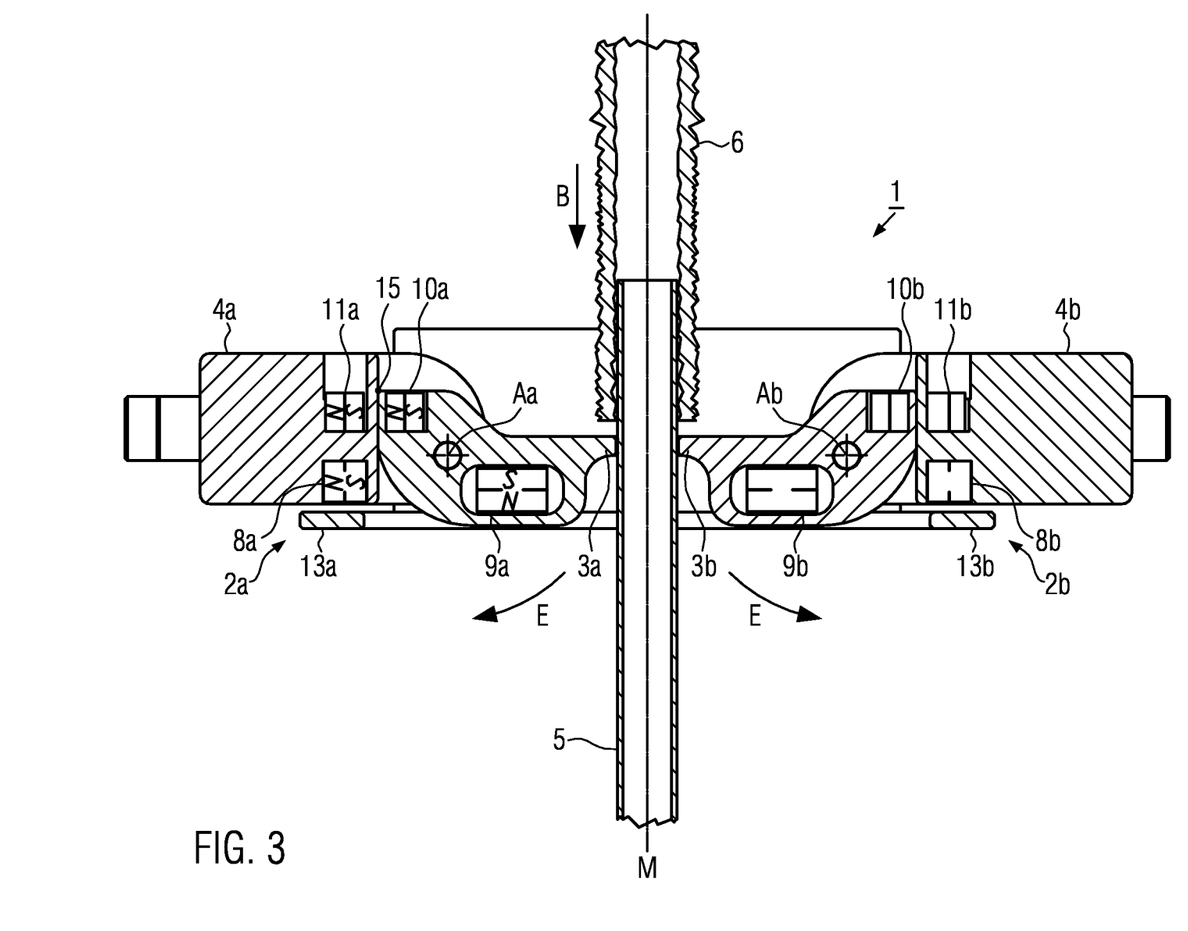
FIG. 3 shows the stuffing tube centering device illustrated in FIGS. 1 and 2, in which a gathered casing stick is pushed onto the stuffing tube.
Figure 5:
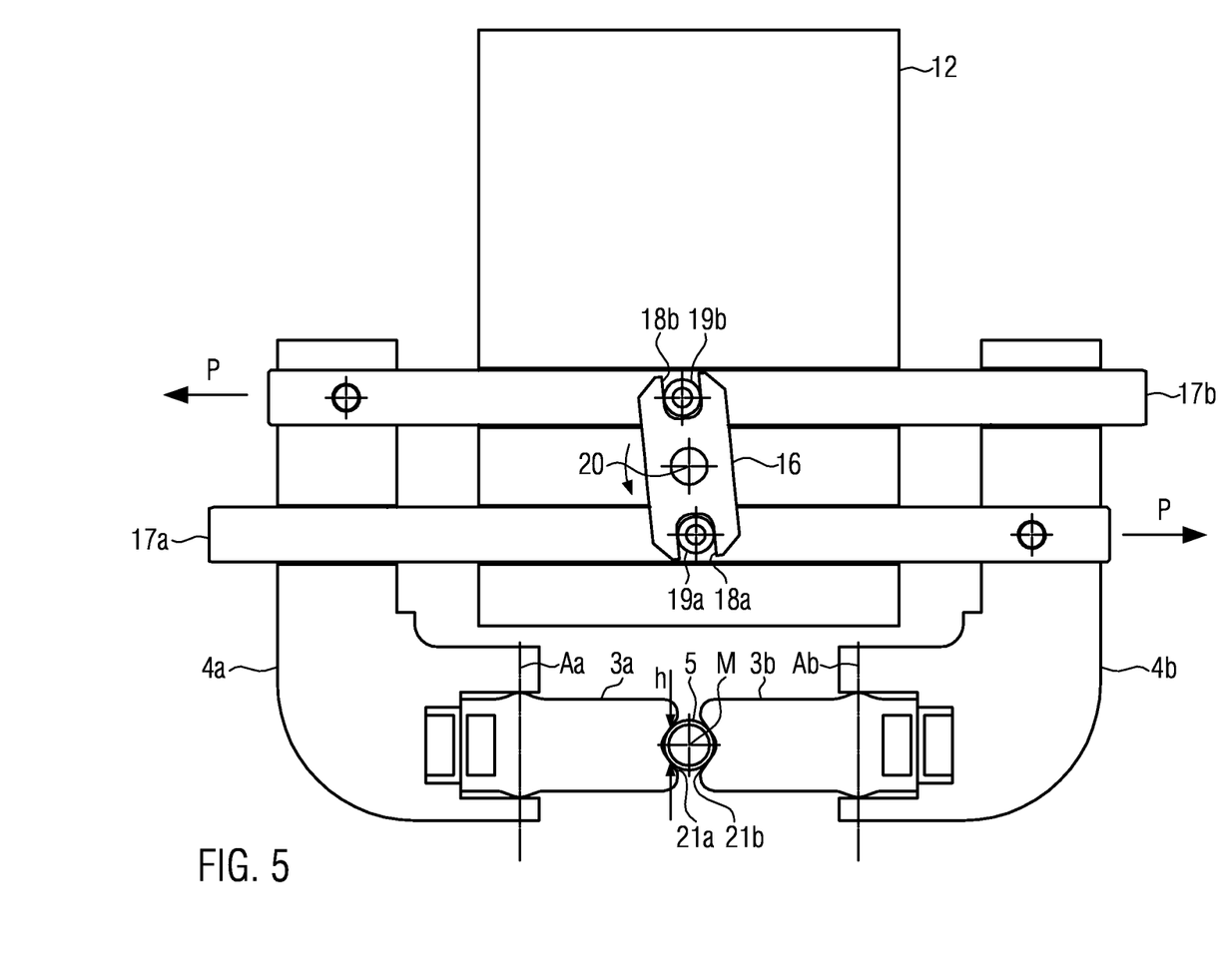
FIG. 5 very schematically shows a front view of the stuffing tube centering device according to the disclosure in a preferred embodiment.
Figure 6:
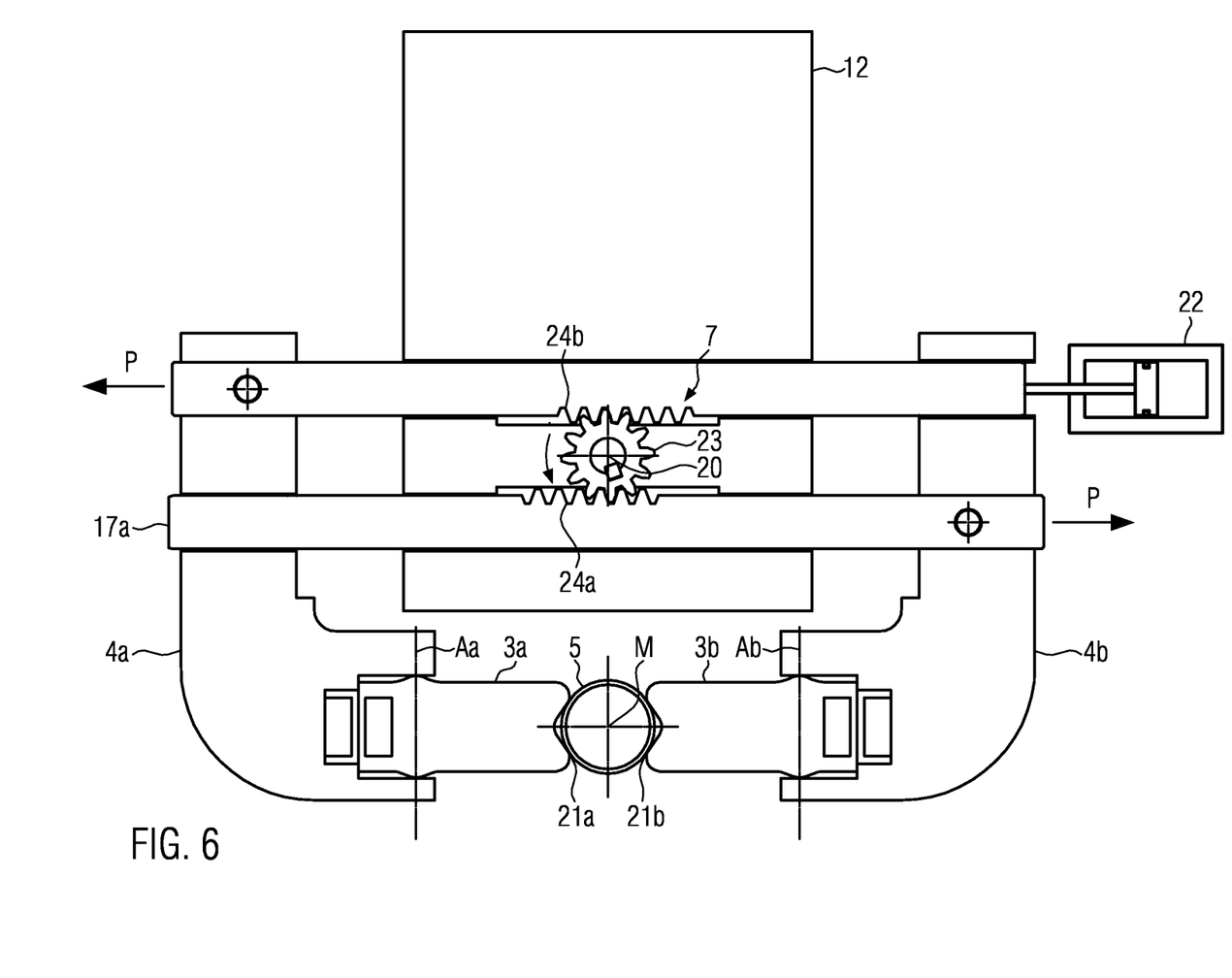
FIG. 6 shows a front view of the stuffing tube centering device according to the disclosure in a further embodiment.

FIG. 5 shows a front view of a device with centering elements 3a,b folded in, as shown, for example, in FIG. 3. A coupling element 7 is provided for coupling the motion of the centering members 2a,b. The coupling member 7 ensures that, when a centering member, e.g. the centering member 2a, is moved outwardly along the arrow, the other centering member 2b is moved by the same distance outwardly away from the center axis M. When the centering member 2a is moved towards the center axis M, the centering member 2b is by the coupling element 7 moved the same distance towards the center axis M. Here, the drive for the motion comprises, for example, a shaft 20 rotating the lever member 16 to the right or to the left. The lever member 16 is via projections 19a, 19b, which come to rest in respective recesses 18a,b of the connection member 16, connected to two guide members 17a,b. If the lever member 16 is now rotated by the shaft 20, as shown by the arrow, the lever member 16 transfers the motion to the guide member 17b, which is presently mounted movably in the support 4b. The support 4a is thereby moved in the direction of the arrow P. Simultaneously, the lever member 16 transfer the motion to the guide member 17a, which likewise extends movably in the support 4a, such that the support 4b being fixedly attached to the guide member 17a moves in the direction of the arrow. The guide member 17b is fixedly attached to the support 4a. Instead of the shaft 20, the drive can also be effected, for example, by a pneumatic cylinder 22 being connected with one of the guide members 17a, as shown in FIG. 6. Instead of the coupling element shown in FIG. 5 in the form of the lever member, a gear 23 can also be provided for coupling the motions, which runs in the serrations 24a, 24b in the respective guide members 17a, 17b. As an alternative to the cylinder 22 shown in FIG. 6, the gear 23 can of course also be driven by a respective shaft 20. Possible drives for the coupling element are, for example, motors, pneumatic or hydraulic cylinders, solenoids etc.

The device also comprises a housing, indicated by 12.

If the stuffing tube 5, as shown in FIG. 2, is now located between the centering members 2a,b, then the supports 4a,b are moved along the arrows P outwardly e.g. by the above-described drive and the corresponding coupling. The device further comprises a guide, presently in the form of a stop 13a,b. During the motion of the support 4a,b outwardly, the centering elements 3a,b run against the stop 13a,b and are due to their curved shape pivoted in the direction of the arrow D about the axis Aa,Ab to the center axis M towards the stuffing tube. In this, the centering elements 3a,b are fully pivoted in up to the stop 15 of the support, such that the centering recesses 21a,b are oppositely disposed. In this, the centering elements 3a,b can be fully pivoted in either exclusively by the motion of the support 4a,b in the direction of the arrow P or the centering elements 3a,b are from a certain pivot angle moved on by magnetic force, for example, in that the magnet 11a attracts the magnet 10a. The magnet 11a holds the magnet 10a in the respective pivoted-in position. When the centering elements 3a,b are fully pivoted in, the supports 4a,b are moved in the direction opposite to the direction of the arrow P on the stuffing tube 5 in the centering position shown in FIG. 3. The two centering members 2a,b or supports 4a,b, respectively, are moved so far towards each other until they enclose the stuffing tube 5, as shown in FIG. 5, and hold it with a defined force and align it. The centering force required was determined experimentally and is so large that the stuffing tubes commonly used can be centered. In this, the centering elements are, also for stuffing tubes having a small diameter, moved sufficiently far towards the center axis so that the latter are securely held and centered.

If the centering elements 3a,b are in their centered position, as shown in FIGS. 3 and 5 and 6, then the gathered casing stick 6 can be mounted by the casing draw-on device onto the stuffing tube 5 in the direction of the arrow B. Since the diameter of the gathered casing stick 6 is greater than that of the stuffing tube 5, the face side of the gathered casing stick can push away the side of the centering elements 3a,b facing the casing stick 6, such that the centering elements 3a,b are pivoted outwardly about the axis Aa,Ab in the direction of the arrow B. The casing stick 6 pushes the centering elements 3a,b away against the magnetic force of the magnets 11a, 10a. From a certain pivot angle of the centering elements 3a,b, the centering elements 3a,b are by the magnetic force of the magnets 8a,b, 9a,b further pivoted to the stop 14 on the support 4a,b.

The centering elements 3a,b each comprise a rounded shape, where, when the centering element 3a,b is in an outwardly pivoted initial position, the two magnets 8a, 9a attract each other, whereas the magnets 11a, 10a are so far away from each other that they do not move the centering elements 3a,b away from this position.

When the centering element 3a,b is pivoted to the centering position, as shown, for example, in FIG. 3, then the magnets 11a, 10a attract each other in such a manner, that the centering element 3a,b is maintained in this position, whereas the two other magnets 8a and 9a are located so far apart that they do not move the centering element 3a,b away from this centering position.

The stuffing tube can, when the casing stick is fully drawn on, be pivoted away together with the casing stick. The centering device is then ready for centering a new stuffing tube.

According to the method of the disclosure, the stuffing tube centering device 1 is first moved to the initial position shown in FIG. 1. A stuffing tube 5 is then moved from a working position to a draw-on position between the centering members 2a,b.

In order to now centrically align the stuffing tube 5, the two centering elements 3a,b are with their front ends pivoted inwardly in the direction of the center axis M and then moved onto the stuffing tube 5 linearly in the direction of the center axis M.

This is performed according to this preferred embodiment as follows:

As is in particular evident from FIG. 2, the supports 4a,b are moved uniformly apart on both sides in the direction of the arrow P. Thereby the rounded portion of the centering elements 3a,b runs against the guide or the stop 13a,b, respectively, and is thereby pivoted about the axis Aa,Ab in the direction of the arrow D towards the center axis M. The centering elements 3a,b are either moved completed by the motion of the supports 4a,b to a position until the respective centering element 3a,b in an end position strikes against the stop 15 at the support. It is also possible that the centering elements 3a,b are via the support 4a,b pivoted inwardly only to a certain pivot angle and the respective centering element 3a,b is then by the magnetic force of the magnets 11a 10a pivoted on to the end position.

The centering elements 3a,b pivoted to this position are then moved linearly in a direction opposite to the direction of the arrow P perpendicular to the center axis M towards the stuffing tube 5, such that the stuffing tube 5 comes to rest in the centering recess 21a,b and is held by the centering elements 3a,b. Thereby, the center axis M of the stuffing tube 5 can be aligned along the center axis M of the centering device and the center axis M of the casing brake to be drawn on.

Figure 4:
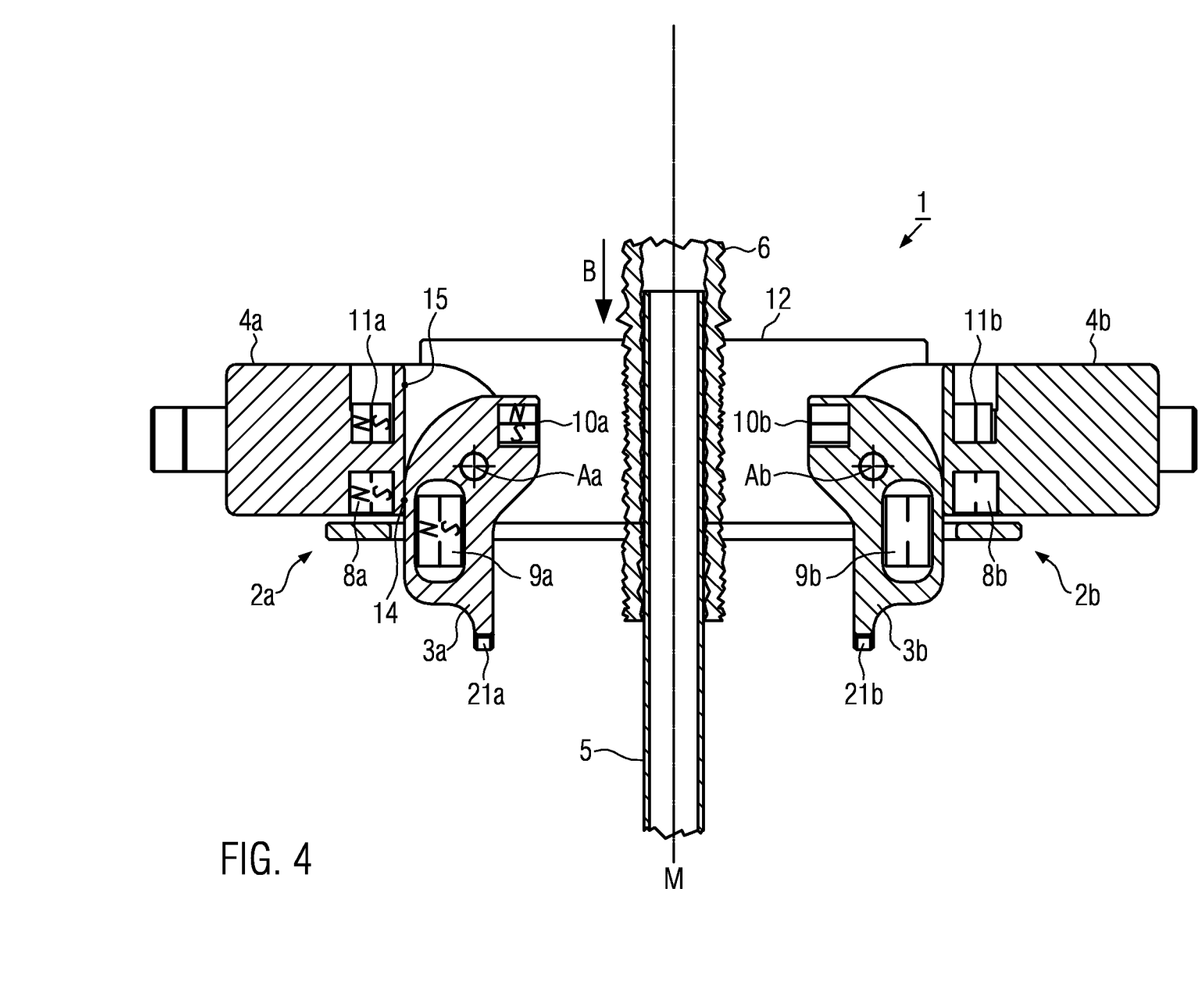
FIG. 4 shows the stuffing tube centering device from FIGS. 1 to 3 with centering elements folded back.

As shown in FIG. 3, in which the stuffing tube centering device is located in the centering position, the casing stick can then be pushed via the casing draw-on device shown in FIG. 7 along the direction of the arrow B onto the stuffing tube 5 until the face side of the rigid casing stick encounters the centering elements 3a,b. The casing stick 6 thereby pushes away the centering elements 3a,b, such that the centering elements 3a,b are pivoted away outwardly about the axes Aa,Ab along the arrow E. The casing stick 6 can deflect the centering elements 3a,b only to a certain pivot angle due to the geometry of the device. Then, however, the respective centering element 3a,b is pivoted further by the magnetic force of the magnets 8a, 9a to the initial position, as shown in FIG. 4, where the centering element 3a,b then abuts on the stop 14 on the support 4a,b.

There are also machines in which the casing stick is not pushed onto the stuffing tube, but where the stuffing tube is inserted into the casing stick. With machines with a stationary casing stick and a movable stuffing tube, the centering device can then also be moved along with the stuffing tube by a respective movement device.

The casing stick is then fully drawn onto the stuffing tube. The stuffing tube 5 can then be pivoted away together with the casing stick, in particular to a working position or to a position prior to the working position.

The centering device 1 is then again in its initial position and can center the next stuffing tube 5.

It is also possible that the stops 14, 15 are not arranged on the support, but, for example, attached to the housing in a corresponding position, this, however, is possible only with a specific stuffing tube diameter or small differences in diameter, respectively. For larger differences in diameter, the stops must be movable.

Since during the assembly of the stuffing tube centering device, the centering elements 2a,b have already been adjusted such that the center axis M of the centering device 1, and thereby that of the centered stuffing tube 5, is aligned with a center axis M of a casing draw-on device and thereby with the casing stick, the operator does not need to readjust the centering device prior to each operation nor adapt it to different stuffing tube diameters. Even bent stuffing tubes no longer pose a problem. The differences of the casing stick inner diameters are within close tolerances. The selected stuffing tube size is based on the smallest casing stick of a batch. For larger sausages having a larger diameter, a stuffing tube having a larger diameter is then selected. If casing sticks of different sizes are used, then they are also centered by the casing draw-on device shown in FIG. 7, such that the center axis of the casing sticks remains constant and can align with the target center axis M of the centering device. For this, for example, the conveyor device 26 can be adjusted in height.

What is claimed is:

1. A stuffing tube centering device for concentric alignment of a stuffing tube to a casing stick, comprising:
    two oppositely disposed centering members movable towards each other between which the stuffing tube is held and centered; and
    the centering members each comprising a centering recess at the front end thereof, where the height of the centering recess is at least sectionally increased in a direction of a center axis of said device, when viewing a longitudinal sectional perpendicular to the center axis.

2. The stuffing tube centering device according to claim 1, wherein the centering elements are by a face side of the casing stick, which is pushed onto the stuffing tube, pivotable apart, away from the stuffing tube.

3. A stuffing tube centering device for concentric alignment of a stuffing tube to a casing stick, comprising:
    two oppositely disposed centering members movable towards each other between which the stuffing tube is held and centered;
    the centering members each comprising a support and a centering element rotatably mounted around a respective axis in the support, wherein the axis extend in the direction perpendicular to the center axis (M) of the stuffing tube; and
    a guide for each centering member that is designed such that the centering elements are each pivoted from an open initial position (G) with the front ends thereof towards each other towards the stuffing tube when the supports move apart and away from the stuffing tube.

4. The stuffing tube centering device according to claim 3, and a drive which can move both supports in the direction of the stuffing tube.

5. A stuffing tube centering device for concentric alignment of a stuffing tube to a casing stick, comprising:
    two oppositely disposed centering members movable towards each other between which the stuffing tube is held and centered;
    the centering members each comprising a support and a centering element rotatably mounted around a respective axis in the support, wherein the axis extends in the direction perpendicular to the center axis (M) of the stuffing tube; and
    the respective centering element and/or wherein the respective support comprises at least one magnet.

6. The stuffing tube centering device according to claim 5, and wherein at least one magnet is arranged such that, when the centering elements are arranged with the front ends thereof pivoted apart by a certain pivot angle away from the stuffing tube, at least one of the centering elements are by magnetic force further pivoted up to a stop to an initial position, or the centering elements are held by magnetic force in the initial position at the stop on the support.

7. The stuffing tube centering device according to claim 6, wherein the stop is at the support.

8. The stuffing tube centering device according to claim 5, and wherein at least one magnet is arranged such that, when the centering elements are arranged with the front ends thereof pivoted towards each other towards said stuffing tube, the centering elements are at a certain pivot angle by magnetic force further pivoted up to a stop to a position in which the centering recesses face each other and/or the centering elements are held in this position at the stop at the support.

9. The stuffing tube centering device according to claim 8, wherein the stop is at the support.

10. A stuffing tube centering device for concentric alignment of a stuffing tube to a casing stick, comprising:
two oppositely disposed centering members movable towards each other between which the stuffing tube is held and centered; and
the held stuffing tube axially displaceable together with the stuffing tube centering device.

11. A stuffing tube centering device for concentric alignment of a stuffing tube to a casing stick, comprising:
two oppositely disposed centering members movable towards each other between which the stuffing tube is held and centered;
a coupling element that couples the motion of the centering members in the direction of the stuffing tube; and
the coupling element being a mechanical coupling agent.

12. A method for centering a stuffing tube, comprising:
moving a stuffing tube from a working position to a draw-on position;
moving two oppositely disposed centering members towards each other, to hold the stuffing tube therebetween and thereby center the stuffing tube at a predetermined position; and
pushing a casing stick onto the centered stuffing tube, where the centering members move away from the stuffing tube when the casing stick has been pushed a certain distance onto the stuffing tube, and where a face side of the casing stick pivots away a centering element rotatably mounted in a support of the respective centering member.

13. The method according to claim 12, wherein, after the casing stick has been one of fully drawn or pushed onto the stuffing tube, moving the stuffing tube back to the working position thereof.

14. The method according to claim 12, wherein the centering members each comprise a support and a centering element rotatably mounted around a respective axis in the support, and wherein the centering elements are pivoted around the respective axis the direction thereof extending perpendicular to the center axis (M) of the stuffing tube.

15. The method according to claim 12, and wherein, during assembly of the stuffing tube centering device, adjusting the centering members such that the center axis (M) of the centering device, and thereby the stuffing tube, is in alignment with a center axis of a casing draw-on device and thereby with the casing stick.

16. The method according to claim 15, wherein adjusting the centering members comprises adjusting the entire stuffing tube centering device.

* * * * *